June 17, 1930.   J. M. TAUBER   1,763,831
LAWN MOWER
Filed Feb. 1, 1929   2 Sheets-Sheet 1

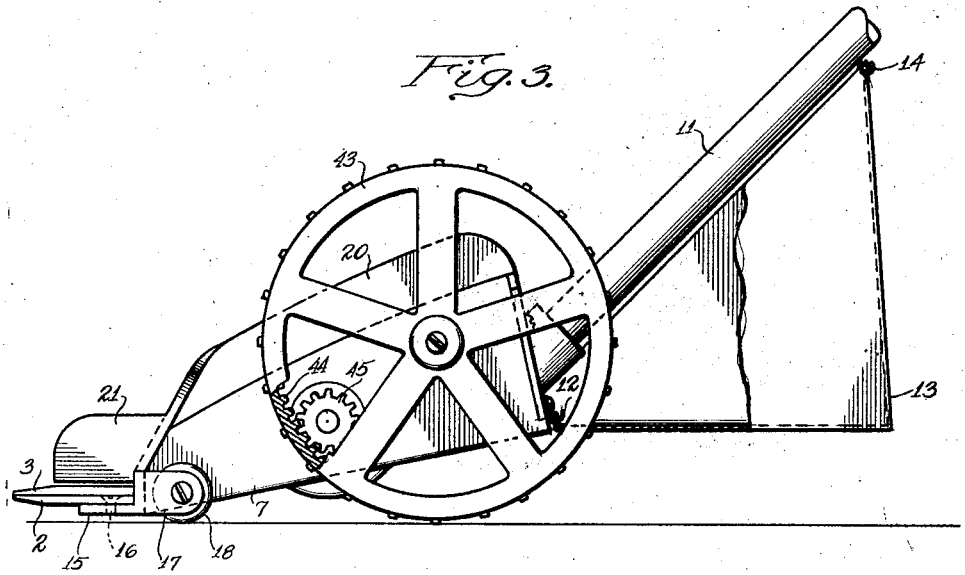
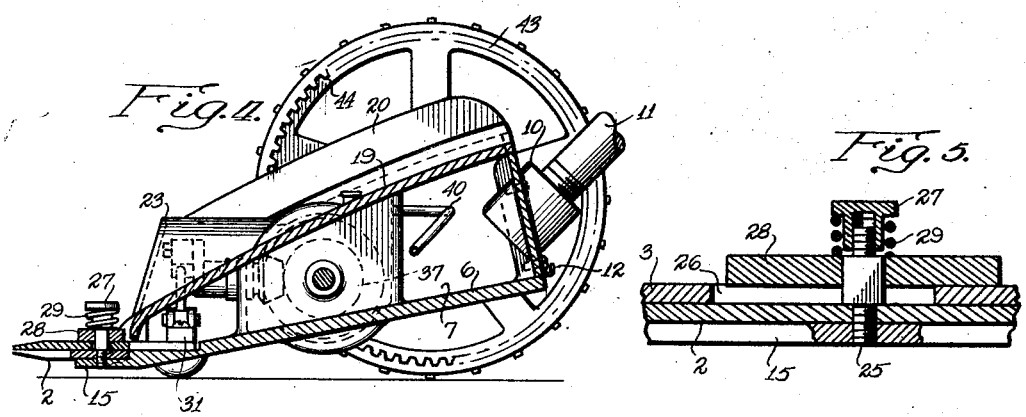
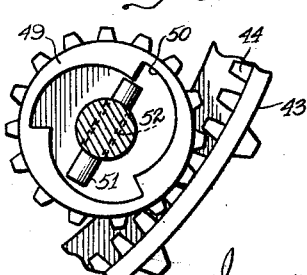

Patented June 17, 1930

1,763,831

UNITED STATES PATENT OFFICE

JOSEPH M. TAUBER, OF CHICAGO, ILLINOIS

LAWN MOWER

Application filed February 1, 1929. Serial No. 336,758.

The main objects of this invention are to provide an improved form of lawn mower of the type employing a reciprocating cutter bar; to provide improved means for reciprocating said cutter bar; to provide improved mechanism for operating said reciprocating means upon the forward movement of the mower; to provide an improved connection between said mechanism and means which is ineffective during the reverse movement of the traction wheels; to provide improved means for lubricating the principal parts of the mower; and to provide an improved runway for directing the mown grass rearwardly over the mower.

An illustrative embodiment of this invention is shown in the accompanying drawing, wherein:—

Fig. 3 is a side elevation taken from the right of Fig. 1 and showing also a basket which is partly broken away.

Fig. 4 is a vertical section, taken on the line 4—4 of Fig. 2.

Fig. 5 is an enlarged detail in section taken on the line 5—5 of Fig. 2.

Fig. 6 is an enlarged detail in elevation showing the connection between the reciprocating means and operating mechanism.

Figure 1:
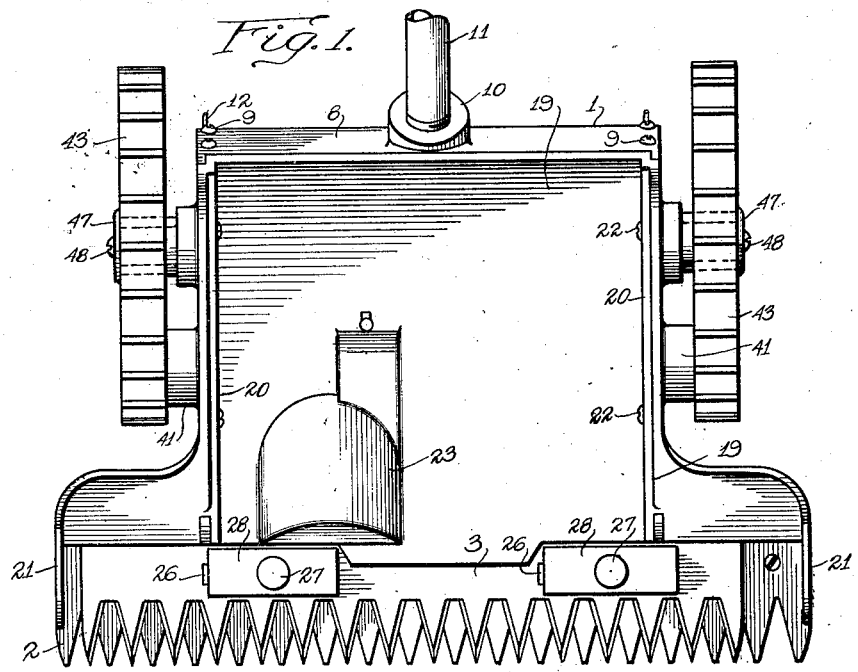
Figure 1 is a top plan of an improved lawn mower, part of the handle being broken away.
Figure 2:
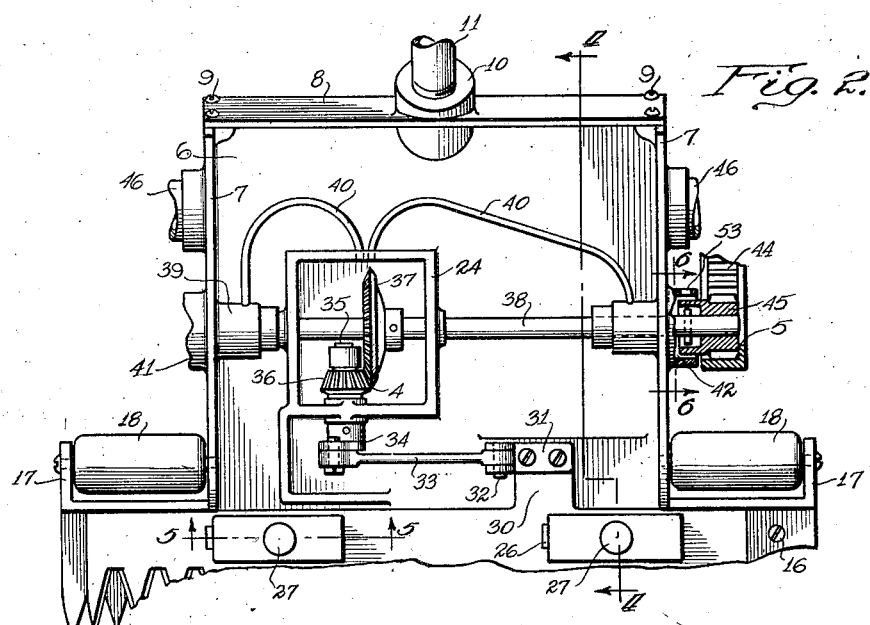
Fig. 2 is a fragmentary top plan of the mower with the top plate removed.

In the construction shown, the improved mower comprises a carriage 1, on which is mounted a fixed cutter blade 2 having slidably supported thereon a reciprocable cutter blade 3 which is actuated by reciprocating means 4 driven by operating mechanism 5.

The carriage 1 may comprise a casting having a base 6 and side walls 7 to which a rear wall 8 is secured by screws 9 or other suitable fastening means. Formed on the rear wall 8, is a boss 10 forming a socket for receiving a handle 11 by which the mower is trundled along the ground. Secured to two of the screws 9, are hooks 12 for supporting the forward end of a basket 13 of any desired construction. The rear end of the basket 13 is detachably secured to the handle 11 by a hook 14.

Formed at the forward end of the base 6, is a shelf 15 for supporting the stationary blade 2, which is rigidly secured to the shelf by screws 16. Formed at the ends of the shelf 15, are brackets 17 for supporting the outer ends of a pair of rollers 18, which are arranged to position the cutter blades at the desired level. The inner ends of the rollers 18 are journaled in the side walls 7.

The side walls 7 are tapered as shown in Figs. 3 and 4 and the upper edges thereof support a cover plate 19 in position to form a runway which inclines rearwardly and upwardly from the cutter blade 3 for directing the mown grass over the rear wall 8 and into the basket 13. Upstanding flanges 20 and 21 are formed at the sides of the runway 19 to prevent the grass from falling over the sides of the mower.

The cover plate 19 is detachably secured to the side walls 7 of the casing by screws 22 or other suitable fastening means.

A portion of the runway 19 is raised to provide a hood 23 for a gear housing 24 which is formed on the base 6 for housing the reciprocating means 4. The housing 24 is adapted to contain a suitable lubricant and its upper rim is sealed by the cover plate 19 to prevent leakage.

The reciprocable blade 3, which is slidably supported on the blade 2, is guided by a pair of studs 25 mounted on the blade 2 and extending upwardly through slots 26 formed in the blade 3. The lower ends of the studs 25 have threaded engagement with the blade 2 and shelf 15 and the upper ends of the studs are provided with threaded adjustable caps 27.

Loosely mounted on the studs 25, are bearing plates 28, which are urged into yielding contact with the blade 3 by springs 29, which bear between the plates 28 and caps 27.

Formed on the rear edge of the blade 3 is a rearwardly projecting lug 30 to which is secured a bearing member 31 having a pin 32 to which is pivoted a link 33. The link 33 is also pivoted to a crank 34 fixed on a shaft 35 of the reciprocating means 4.

In the construction illustrated, the reciprocating means 4 includes gears 36 and 37 located within the housing 24. The gear 36 is fixed on the shaft 35 and the gear 37 is fixed on a shaft 38 which is journaled in bearings 39 formed in the side walls 7.

Tubes 40 conduct some of the lubricant from the housing 24 to the bearings 39. The lubricant is forced through the tubes 40 by the churning action of the gears 36 and 37.

Formed on the outer faces of the side walls 7 in axial alinement with the bearings 39, are bosses 41 having sockets 42 for housing part of the operating mechanism 5.

In the construction illustrated, the operating mechanism 5 includes a pair of traction wheels 43 having internal gears 44 meshing with pinions 45, which are loosely mounted on the ends of the drive shaft 38. The wheels 43 are journaled on stub shafts 46 which are provided with washers 47 and screws 48 for detachably securing the wheels to the shafts.

In the form shown, the pinions 45 are provided with hub portions 49 having internal ratchets 50 adapted to engage pins 51 which are loosely supported in slots 52 extending through the drive shaft 38. With this improved construction and arrangement of parts, upon the forward movement of the mower, the ratchets 50 engage the pins 51 for driving the shaft 38 and upon the backward movement of the mower, the ratchets 50 merely reciprocate the pins 51.

Formed in the bosses 41, are apertures 53 through which the pins 51 may be inserted and removed.

In operation, in trundling the mower forwardly, the cutter blade 3 is reciprocated through the action of the gears 36 and 37, drive shaft 38, pinions 45 and traction wheels 43. During the rotation of the gears 36 and 37, some of the lubricant in the housing 24 is forced through the tubes 40 to the bearings 39. Some lubricant also flows along the shaft 35 through the front wall of the housing 24 for lubricating the connections between the crank 34, link 33 and pin 32.

Upon the forward movement of the mower, the mown grass is pushed up the inclined runway 19 and falls into the basket 13.

Although but one specific embodiment of this invention has been herein shown and described, it will be understood that numerous details of the construction shown may be altered or omitted without departing from the spirit of this invention as defined by the following claims.

I claim:

1. A mower comprising a carriage, traction wheels for supporting said carriage, a reciprocable cutter blade on said carriage, bearings on said carriage, a drive shaft journaled in said bearings and driven by one of said wheels, a gear housing on said carriage adapted to contain a lubricant, a pair of coacting gears in said housing, one of said gears being fast on said shaft, a crank connected to the other gear and arranged to reciprocate said blade, said housing having an oil outlet located above the level of said shaft, and means providing communication between said outlet and bearings for conducting some of the lubricant to said bearings.

2. A mower comprising a carriage, supporting wheels for said carriage, a reciprocable cutter blade supported on the forward end of said carriage, means housed within said carriage for reciprocating said blade, and a removable cover plate mounted on said carriage, said cover plate being inclined upwardly and rearwardly from said blade to form a runway for directing the mown grass over the rear edge of said carriage.

Signed at Chicago this 30th day of January, 1929.

JOSEPH M. TAUBER.